(12) United States Patent
Boudreaux et al.

(10) Patent No.: US 11,780,742 B2
(45) Date of Patent: Oct. 10, 2023

(54) METHODS FOR ONLINE CONTROL OF A CHEMICAL TREATMENT SOLUTION USING SCALE SATURATION INDICES

(71) Applicant: CHEMTREAT, INC., Glen Allen, VA (US)

(72) Inventors: Kevin Boudreaux, Sioux Falls, SD (US); Bill Gonzalez, Glenwood, NJ (US); Kerry Killough, Cypress, TX (US)

(73) Assignee: CHEMTREAT, INC., Glen Allen, VA (US)

( * ) Notice: Subject to any disclaimer, the term of this patent is extended or adjusted under 35 U.S.C. 154(b) by 316 days.

(21) Appl. No.: 17/103,018

(22) Filed: Nov. 24, 2020

(65) Prior Publication Data
US 2021/0331942 A1 Oct. 28, 2021

Related U.S. Application Data

(60) Provisional application No. 63/015,042, filed on Apr. 24, 2020.

(51) Int. Cl.
*C02F 1/00* (2023.01)
*C02F 5/12* (2023.01)
*C02F 5/14* (2023.01)
*C02F 103/10* (2006.01)

(52) U.S. Cl.
CPC .............. *C02F 1/008* (2013.01); *C02F 5/12* (2013.01); *C02F 5/14* (2013.01); *C02F 2103/10* (2013.01); *C02F 2209/02* (2013.01); *C02F 2209/055* (2013.01); *C02F 2209/06* (2013.01); *C02F 2209/07* (2013.01); *C02F 2301/046* (2013.01)

(58) Field of Classification Search
CPC ....................................................... C02F 1/008
See application file for complete search history.

(56) References Cited

U.S. PATENT DOCUMENTS

| 5,510,038 A | 4/1996 | Wegmueller |
| 2014/0197102 A1 | 7/2014 | Van Der Wal et al. |
| 2016/0060147 A1 | 3/2016 | Moore et al. |
| 2018/0186656 A1* | 7/2018 | Drewniak ............... C02F 5/125 |

OTHER PUBLICATIONS

Process Instruments, Real time Hardness and Alkalinity monitoring from one analyser, Sep. 24, 2019, https://www.pisales.co.uk/2019/09/24/real-time-hardness-and-alkalinity-monitoring-from-one-analyser/.

\* cited by examiner

*Primary Examiner* — Peter Keyworth
(74) *Attorney, Agent, or Firm* — Oliff PLC

(57) ABSTRACT

A method for applying a chemical treatment solution to a process stream in an industrial processing system while the system is online. The method includes measuring a mineral hardness and alkalinity of the process stream, determining a dosage of the chemical treatment solution based on a relationship between the dosage and a scale saturation parameter that is calculated based on the mineral hardness and the alkalinity of the process stream, and controlling application of the chemical treatment solution to the process stream based on the determined dosage.

20 Claims, 8 Drawing Sheets

FIG. 4

| Delta T | Exit Water Temp | Estimated Skin Temp F (3 inHg BP) | Estimated Skin Temp C | LSI | PAA Feed ppm | Product PPM | Product lbs/day for Fayette Plant | lbs/day Difference | $$$/day difference | $$$/yr difference |
|---|---|---|---|---|---|---|---|---|---|---|
| 1 | 86.0 | 101.6 | 38.7 | 1.18 | 0.190 | 0.379 | 3531 | | | |
| 2 | 87.0 | 102.0 | 38.9 | 1.19 | 0.191 | 0.382 | 3559 | | | |
| 3 | 88.0 | 102.4 | 39.1 | 1.19 | 0.193 | 0.385 | 3587 | | | |
| 4 | 89.0 | 102.8 | 39.3 | 1.19 | 0.194 | 0.388 | 3615 | | | |
| 5 | 90.0 | 103.2 | 39.6 | 1.20 | 0.196 | 0.391 | 3644 | | | |
| 6 | 91.0 | 103.6 | 39.8 | 1.20 | 0.197 | 0.394 | 3672 | | | |
| 7 | 92.0 | 104.0 | 40.0 | 1.20 | 0.199 | 0.397 | 3701 | | | |
| 8 | 93.0 | 104.4 | 40.2 | 1.21 | 0.200 | 0.401 | 3731 | | | |
| 9 | 94.0 | 104.8 | 40.4 | 1.21 | 0.202 | 0.404 | 3760 | | | |
| 10 | 95.0 | 105.2 | 40.7 | 1.21 | 0.203 | 0.407 | 3790 | | | |
| 11 | 96.0 | 105.6 | 40.9 | 1.22 | 0.205 | 0.410 | 3820 | | | |
| 12 | 97.0 | 106.0 | 41.1 | 1.22 | 0.207 | 0.413 | 3850 | | | |
| 13 | 98.0 | 106.4 | 41.3 | 1.22 | 0.208 | 0.417 | 3881 | | | |
| 14 | 99.0 | 106.8 | 41.6 | 1.23 | 0.210 | 0.420 | 3911 | | | |
| 15 | 100.0 | 107.2 | 41.8 | 1.23 | 0.212 | 0.423 | 3942 | | | |
| 16 | 101.0 | 107.6 | 42.0 | 1.23 | 0.213 | 0.427 | 3973 | | | |
| 17 | 102.0 | 108.0 | 42.2 | 1.24 | 0.215 | 0.430 | 4005 | | | |
| 18 | 103.0 | 108.4 | 42.4 | 1.24 | 0.217 | 0.433 | 4037 | | | |
| 19 | 104.0 | 108.8 | 42.7 | 1.24 | 0.218 | 0.437 | 4069 | | | |
| 20 | 105.0 | 109.2 | 42.9 | 1.25 | 0.220 | 0.440 | 4101 | | | |
| 21 | 106.0 | 109.6 | 43.1 | 1.25 | 0.222 | 0.444 | 4133 | | | |
| 22 | 107.0 | 110.0 | 43.3 | 1.25 | 0.224 | 0.447 | 4166 | | | |
| 23 | 108.0 | 110.4 | 43.6 | 1.26 | 0.225 | 0.451 | 4199 | | | |
| 24 | 109.0 | 110.8 | 43.8 | 1.26 | 0.227 | 0.455 | 4232 | | | |
| 25 | 110.0 | 111.2 | 44.0 | 1.26 | 0.229 | 0.458 | 4266 | | | |
| 26 | 111.0 | 111.6 | 44.2 | 1.27 | 0.231 | 0.462 | 4300 | | | |
| 27 | 112.0 | 112.0 | 44.4 | 1.27 | 0.233 | 0.465 | 4334 | | | |
| 28 | 113.0 | 112.4 | 44.7 | 1.27 | 0.235 | 0.469 | 4368 | | | |
| 29 | 114.0 | 112.8 | 44.9 | 1.28 | 0.236 | 0.473 | 4403 | 334 | 541 | 197401 |
| 30 | 115.0 | 113.2 | 45.1 | 1.28 | 0.238 | 0.477 | 4437 | | | |

*Seasonal Delta T chart during July 2019.

FIG. 5

| Delta T | Exit Water Temp | Estimated Skin Temp F (1.75 inHg BP) | Estimated Skin Temp C | LSI | PAA Feed ppm | Product PPM | Product lbs/day for Fayette Plant | lbs/day Difference | $$$/day difference | $$$/yr difference |
|---|---|---|---|---|---|---|---|---|---|---|
| 1 | 66.0 | 84.6 | 29.2 | 1.03 | 0.138 | 0.276 | 2568 | | | |
| 2 | 67.0 | 85.0 | 29.4 | 1.04 | 0.139 | 0.278 | 2586 | | | |
| 3 | 68.0 | 85.4 | 29.7 | 1.04 | 0.140 | 0.280 | 2604 | | | |
| 4 | 69.0 | 85.8 | 29.9 | 1.04 | 0.141 | 0.282 | 2623 | | | |
| 5 | 70.0 | 86.2 | 30.1 | 1.05 | 0.142 | 0.284 | 2642 | | | |
| 6 | 71.0 | 86.6 | 30.3 | 1.05 | 0.143 | 0.286 | 2660 | | | |
| 7 | 72.0 | 87.0 | 30.6 | 1.05 | 0.144 | 0.288 | 2679 | | | |
| 8 | 73.0 | 87.4 | 30.8 | 1.06 | 0.145 | 0.290 | 2699 | | | |
| 9 | 74.0 | 87.8 | 31.0 | 1.06 | 0.146 | 0.292 | 2718 | | | |
| 10 | 75.0 | 88.2 | 31.2 | 1.07 | 0.147 | 0.294 | 2738 | | | |
| 11 | 76.0 | 88.6 | 31.4 | 1.07 | 0.148 | 0.296 | 2758 | | | |
| 12 | 77.0 | 89.0 | 31.7 | 1.07 | 0.149 | 0.298 | 2778 | | | |
| 13 | 78.0 | 89.4 | 31.9 | 1.08 | 0.150 | 0.301 | 2798 | | | |
| 14 | 79.0 | 89.8 | 32.1 | 1.08 | 0.151 | 0.303 | 2819 | | | |
| 15 | 80.0 | 90.2 | 32.3 | 1.08 | 0.152 | 0.305 | 2840 | | | |
| 16 | 81.0 | 90.6 | 32.6 | 1.09 | 0.154 | 0.307 | 2861 | | | |
| 17 | 82.0 | 91.0 | 32.8 | 1.09 | 0.155 | 0.310 | 2882 | | | |
| 18 | 83.0 | 91.4 | 33.0 | 1.09 | 0.156 | 0.312 | 2904 | | | |
| 19 | 84.0 | 91.8 | 33.2 | 1.10 | 0.157 | 0.314 | 2926 | | | |
| 20 | 85.0 | 92.2 | 33.4 | 1.10 | 0.158 | 0.317 | 2948 | | | |
| 21 | 86.0 | 92.6 | 33.7 | 1.10 | 0.159 | 0.319 | 2970 | | | |
| 22 | 87.0 | 93.0 | 33.9 | 1.11 | 0.161 | 0.321 | 2992 | | | |
| 23 | 88.0 | 93.4 | 34.1 | 1.11 | 0.162 | 0.324 | 3015 | | | |
| 24 | 89.0 | 93.8 | 34.3 | 1.11 | 0.163 | 0.326 | 3038 | | | |
| 25 | 90.0 | 94.2 | 34.6 | 1.12 | 0.164 | 0.329 | 3061 | | | |
| 26 | 91.0 | 94.6 | 34.8 | 1.12 | 0.166 | 0.331 | 3084 | | | |
| 27 | 92.0 | 95.0 | 35.0 | 1.13 | 0.167 | 0.334 | 3108 | | | |
| 28 | 93.0 | 95.4 | 35.2 | 1.13 | 0.168 | 0.336 | 3132 | | | |
| 29 | 94.0 | 95.8 | 35.4 | 1.13 | 0.169 | 0.339 | 3156 | 514 | 833 | 303961 |
| 30 | 95.0 | 96.2 | 35.7 | 1.14 | 0.171 | 0.341 | 3180 | | | |

*Seasonal Delta T chart during February 2019.

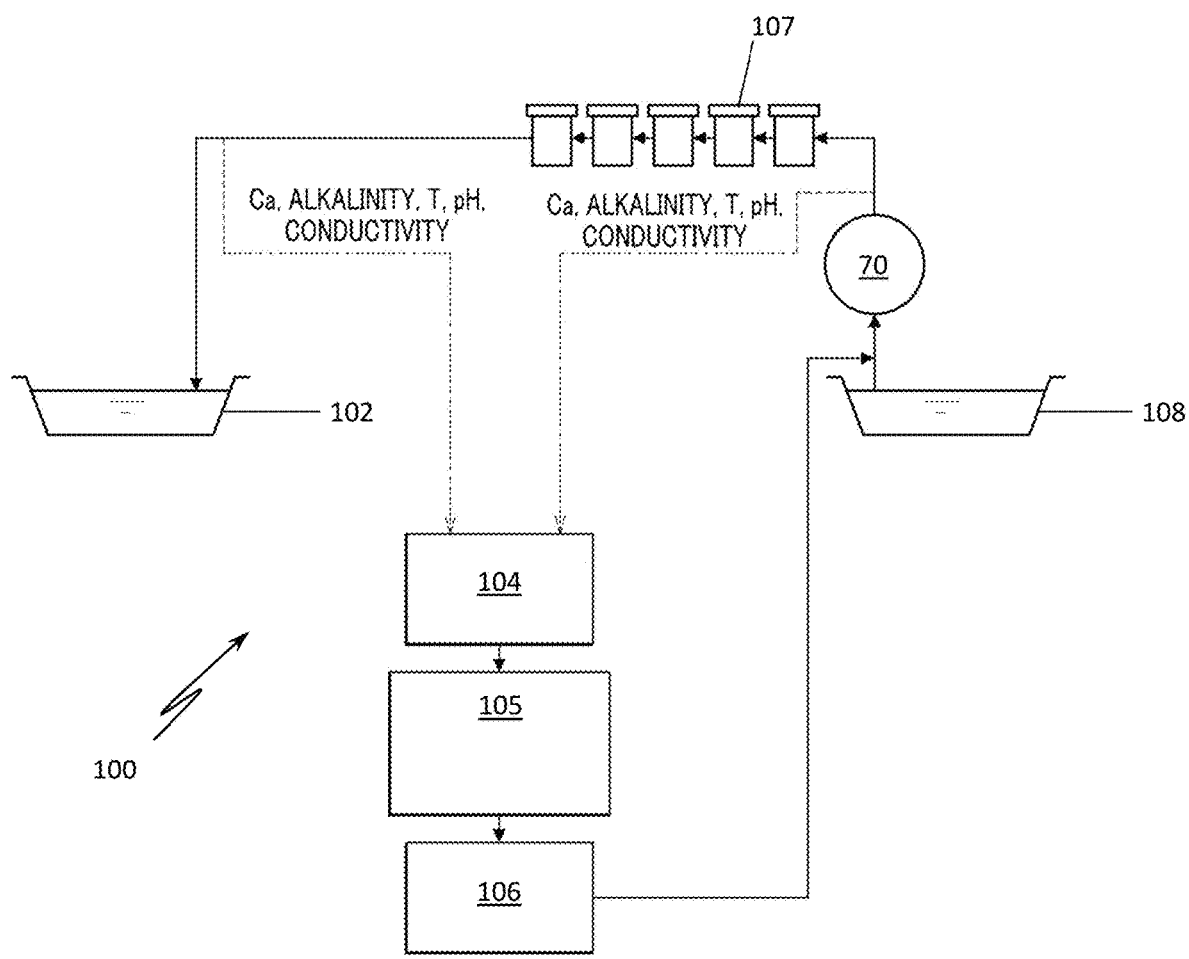

METHODS FOR ONLINE CONTROL OF A CHEMICAL TREATMENT SOLUTION USING SCALE SATURATION INDICES

This application claims priority to Provisional Application No. 63/015,042, filed Apr. 24, 2020. The entire contents of the prior application are hereby incorporated by reference herein in their entirety.

TECHNICAL FIELD

This application relates to methods for automated online control of chemical solutions using scale saturation indices.

BACKGROUND

Mineral scaling is perhaps one of the most common and detrimental problems throughout all industrial processing system including water treatment applications, from reverse osmosis processes, to boiler applications, to once-through cooling. It is also one of the most common and detrimental problems throughout all mineral process applications, from grinding and milling, to thickening and flotation, to leaching and metal recovery. Scale reduces process water throughput and target mineral recovery, negatively impacting a mine's operational costs. Scaling occurs when the saturation index for a compound (e.g., calcium, silica, magnesium) is exceeded, i.e., when the levels of dissolved inorganic salts exceed their respective solubility limits in water and precipitate on metal surfaces, such as feed and transfer pumps, piping, and equipment. A scale saturation index (SSI) represents the degree of saturation of a process medium with respect to a specific compound. SSI calculations were developed to predict whether or not a process stream, such as a water or mineral process stream has a scaling or a corrosion tendency. Whether a process solution exceeds the SSI for a given compound, is affected by factors such as an increase or decrease in temperature, pH, and/or ionic concentrations.

To calculate the SSI of water or mineral process solution according to conventional practice, an individual typically needs several parameters such as calcium, alkalinity, pH, skin temperature, chlorides, sulfates, silica and specific conductivity. Through a series of calculations, the saturation pH (pHs) is determined. From this, it is possible to determine SSI by taking the actual real-time pH and subtracting the saturation pHs.

SSI determination is important in many types of water systems, including once-through cooling applications that require a significant amount of antiscalant (e.g., based on pounds fed) to prevent scaling in heat exchanger components of the system, recirculating systems outfitted with cooling towers, and mineral process applications. It is also important in many mineral process applications as a means of assessing the potential for scale formation and for adjusting treatment programs to reduce the potential for this scale and its deposition. In many mining operations, chemical additives, often referred to as scale control agents, scale or deposit inhibitors, or antiscalants, are dosed to a process stream to reduce the potential for inorganic scale formation. These additives may be a single component, such as a low molecular weight anionic polymeric dispersant, such as sodium polyacrylate or sodium polymaleate, or a sequestrant, such as sodium hydroxyethylidene diphosphonate (HEDP), or a blend of dispersants and sequestrants. The selection of a particular antiscalant program is typically determined by the process water treatment service company, and is usually based on a number of inputs, including a water analysis of the process stream to be treated, analyses of any deposits found in the stream, operating conditions such as temperature and flow rates, calculated scaling tendencies, and any proprietary tests that the water treatment company might use to assess their potential antiscalant programs.

The presence of scale, or the performance of the antiscalant program, is often detected by mining operations in a number of indirect ways, including decreased flow rates of the process stream, increases in the pressure across a piece of equipment, and extended times to get to an operating temperature or pressure.

The extent of scale formation may also be monitored more directly in mining operations, with the use of retractable scale coupons. These are usually perforated cylinders that are placed in a large diameter pipe of the stream being treated and withdrawn periodically for inspection by mine or antiscalant supplier personnel. Based upon the presence or absence of scale on the coupon, antiscalant feed rates are adjusted. While the use of these coupons is often the standard for measuring scale control performance in the mining industry, there are drawbacks to their use.

For example, the coupons simply provide a perspective of what has happened to the operation since their last inspection. Typically, a coupon is pulled from the system and examined once every 1-2 weeks. If it shows scale when inspected, and was previously clean, all that is really known is that some change in the operation—in the water chemistry or the antiscalant feed rate—has occurred since the last inspection, to cause the deposition. Consequently, mining operators are often adjusting their antiscalant programs based on a prior event that may have been a transient occurrence, and are not prepared for future changes or upsets in process water quality that can negatively impact their scale control program and consequently, their mineral recovery.

In recent years, online deposit monitors have been evaluated in the mining industry, including the use ultrasound and tuning fork frequency to determine if scale is forming. One of the drawbacks of these technologies, in addition to their susceptibility to fouling and scale formation, is that they only detect that scale is forming or has formed. In other words, they are reactive tools. And while they may provide an improvement in detection time versus the use of retractable scale coupons, they are not proactive in response to the potential for scale formation.

Process water is not static in quality, and consequently, the potential for scale formation can change quite quickly. In addition to the seasonal changes in water quality and temperature, changes in the mineral content of the ore being mined, and the amount of lime or caustic that may be added to maintain a targeted range of process water pH can fluctuate, increasing or decreasing the potential for scale formation. Various predictive tools to assess the potential for scale formation have been developed and refined over the years for use in the industrial and process water treatment industries. However, these conventional processes can be expensive, and are usually manually controlled based on theoretical numbers. Further, temperature, process loading, and pH changes, are drivers of seasonal variation in the water systems. Conventional processes usually adjust antiscalant feed on no sooner than a weekly basis, and without regard to the seasonal variation. As a result, operators have no choice but to feed antiscalant according to a worst-case scenario, i.e., overfeeding to ensure that enough antiscalant is applied at all times regardless of variation in seasonal load impact. This results in an overall increase in inefficiency and expense. As a result, there is a substantial need for better methods for assessing antiscalant demand and automating antiscalant feed patterns based on the demand.

SUMMARY

The disclosed methods solve these and other problems by using online SSI calculation methods and controlled automation of chemical feed solutions. While SSI calculations have been used extensively for many decades, online SSI calculation and automation of chemical feed using online SSI represents a novel approach to managing scale in industrial processing system such as water and mineral process systems. In this regard, the ability to obtain online pH, specific conductivity, and skin temperature has existed for many years, but the ability to obtain online calcium and alkalinity concentrations has not. The inventors discovered that recent technological developments that permit the capturing of online hardness and alkalinity concentrations are surprisingly beneficial in the application of the disclosed online SSI measurement methods.

According to embodiments, it is possible to automate dosage concentrations of scale inhibitor chemistries using real-time SSI calculations. The objective is to ensure clean system components such as internal pipe and equipment components, e.g., heat exchanger and leach surfaces, in an ever-changing environment by optimizing scale inhibitor feed concentrations, thereby optimizing scale inhibitor costs. Water, operations and system data such as water hardness, alkalinity, temperature, conductivity, and flow, and operations data including process temperature, and outlet water temperature, is captured online. From this, saturation indices are calculated for each antiscalant, and using the resulting curves for each antiscalant, the antiscalant feed rate is controlled accordingly.

In embodiments, there is provided a method for applying a chemical treatment solution to a process stream in an industrial processing system. The method includes, while the system is online, measuring a mineral hardness and alkalinity of the process stream, determining a dosage of the chemical treatment solution based on a relationship between the dosage and a scale saturation parameter that is calculated based on the mineral hardness and the alkalinity of the process stream, and controlling application of the chemical treatment solution to the process stream based on the determined dosage.

BRIEF DESCRIPTION OF THE DRAWINGS

FIG. 4 is a tabular representation of data taken from an exemplary once-through system during one time period.

FIG. 5 is a tabular representation of data taken from an exemplary once-through system during another time period.

FIG. 8 is a schematic diagram of a mineral process system including an automated chemical feed control system according to an embodiment.

DETAILED DESCRIPTION

Disclosed methods employ an online hardness and alkalinity probe along with conventional online pH, specific conductivity, and temperature probes to allow for novel online measurement and recordation of SSI parameters. The SSI calculation is determined based on the measured and recorded SSI parameters. According to disclosed methods, online automated control of the chemical (e.g., antiscalant) feed operation is affected based on the SSI calculation.

As used herein, the term "online" refers to a measurement being taken and recorded while the industrial processing system is operational and a process stream is circulated through equipment, such as a heat-exchanger or leach circuit, as opposed to being "offline" when operation ceases.

Disclosed embodiments will now be described with respect to exemplary embodiments of industrial processing systems, including water system and mineral process system. It will understood that it is not intended for this disclosure to be limited to these specific embodiments.

Water Systems

Figure 1A:
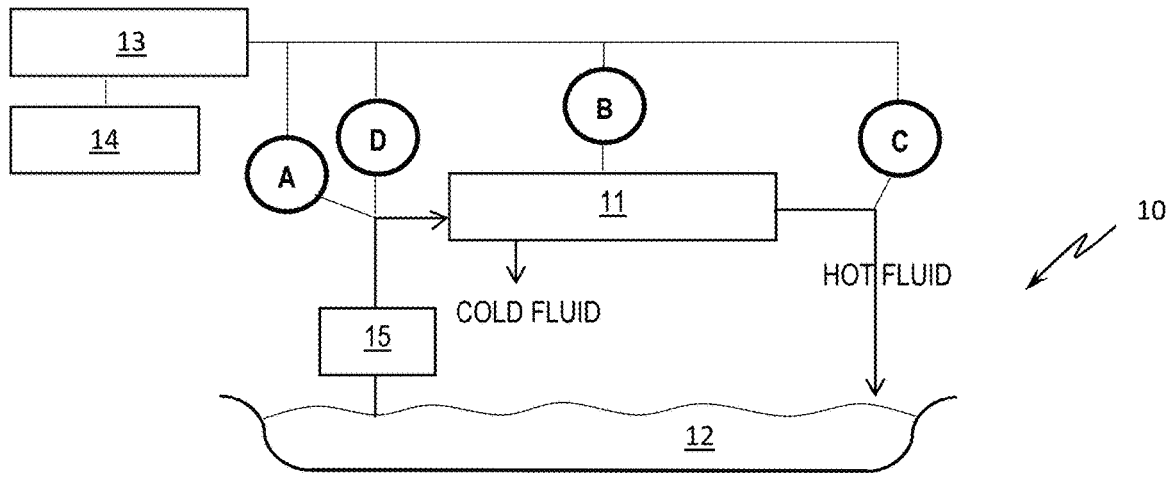
FIG. 1A is a schematic diagram of a once-through system according to an embodiment.
Figure 1B:
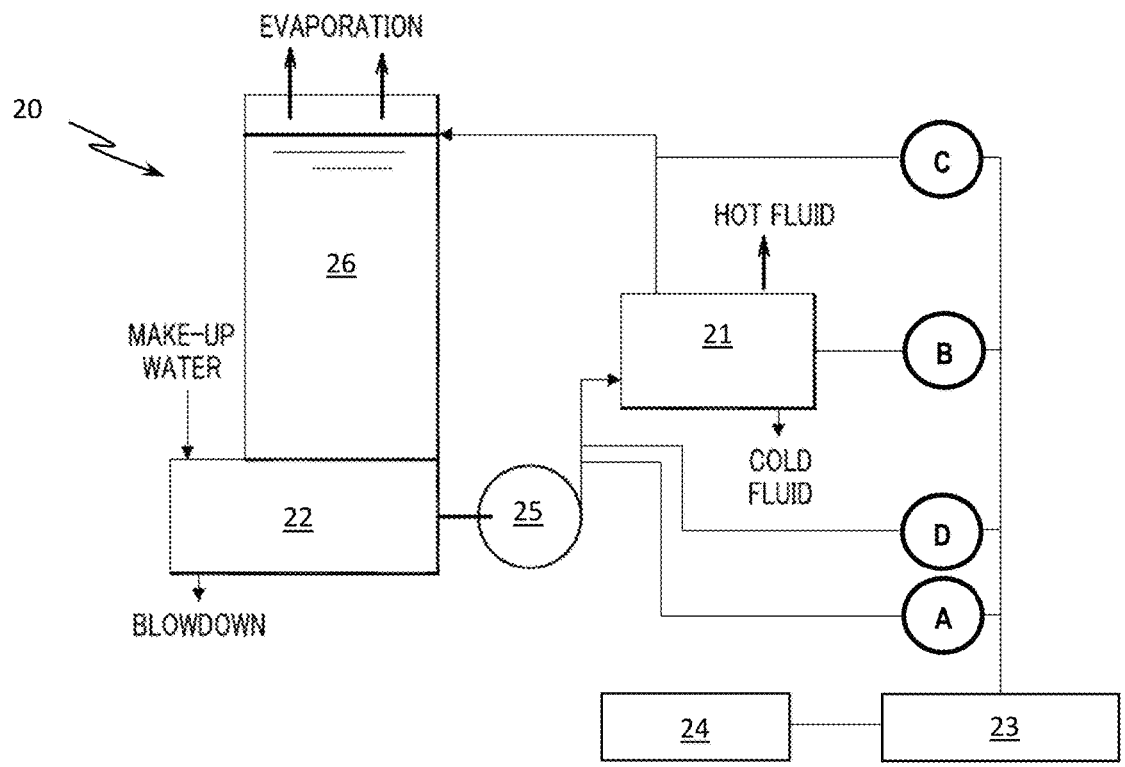
FIG. 1B is a schematic diagram of a recirculating system according to an embodiment.

The disclosed online SSI calculation and chemical feed embodiments can be used in conjunction any suitable water system including, but not limited to, natural water, drinking water, industrial water, urban effluent, industrial effluent, and sludge systems. The water system may be, for example, a once-through system 10, as illustrated in FIG. 1A, or a recirculating system 20, as illustrated in FIG. 1B. These systems including cooling components, such as heat exchangers, for cooling water flow streaming through the systems.

As seen in FIG. 1A, the once-through system 10 includes a flow path defined by water sourced from a natural water source that is pumped through a heat exchanger 11 via pump 15 and returned to the same or different water source 12. As seen in FIG. 1B, the recirculating system 20 includes a flow path defined by water sourced from a natural water source 22 that is pumped through a heat exchanger 21 via pump 25 and then enters the atmospheric cooling tower 26 after leaving the heat exchanger 21 to be cooled by the cooling tower then recirculated through the system.

As seen in FIGS. 1A and 1B, the systems 10 and 20 include probes A, which include a pH probe, an online hardness and alkalinity analyzer, and a conductivity probe, that is disposed upstream of the heat exchanger 11,21. Systems 10 and 20 also include process temperature probes B and C (e.g., inlet water temperature, outlet water temperature, and process side temperature), as shown in FIGS. 1A and 1B.

Feed system D is disposed upstream of the heat exchanger 11,21 and is configured to feed a specified chemical treatment solution into the water stream before it enters the heat exchanger 11,21. By bringing the inputs collected from probes A, B, and C back to a controller 13,23 (e.g., a programmable logic controller, or PLC), feed system D is controlled based on the results computed by the PLC, as shown in FIGS. 1A and 1B. The systems 10 and 20 may also include a data storage 14,24 for storing various dosage and amount schemes implemented by the controller 13,23, as seen in FIGS. 1A and 1B.

The online hardness and alkalinity analyzer may be a reagent-based analyzer. The online hardness and alkalinity analyzer may have a measurement capability at real-time, i.e., continuously, or at near real-time, or intervals with a testing frequency being within predetermined intervals. In various embodiments, the intervals may be less than 5 minutes, less than 10 minutes, less than 15 minutes, less than 20 minutes, less than 30 minutes, less than 1 hour, less than 2 hours, less than 6 hours, or less than 12 hours. The intervals may be in the range of 1 minute to 24 hours, 1 minute to 12 hours, 5 minutes to 12 hours, 10 minutes to 6 hours, 15 minutes to 2 hours, 20 minutes to an hour, or 30 minutes to an hour. The frequency employed in measurements taken in the disclosed embodiments may depend on the particular system. For example, it will be understood that the scale inhibition dynamics of the once-through system 10 differ from the recirculating system 20 at least in that, in the once-through system 10, scale is being inhibited for only about 10 seconds, whereas in the cooling tower of the recirculating system 20, water is sitting for much longer.

Online SSI Measurement and Recordation

The controllers 13,23 are programmable to measure and record a variety of parameters for use in online SSI measurement and recordation, according to embodiments. Any suitable SSI calculation can be used in conjunction with the disclosed embodiments. For example, the SSI calculation may include, but is not limited to, the Langelier Saturation Index, Ryznar Stability Index, Puckorius Scaling Index, Larson-Skold Index, Stiff-Davis Index, and Oddo-Tomson Index. For purposes of this disclosure, further reference to the disclosed embodiments will be made with respect to the Langelier Saturation Index (LSI) and Puckorius Scaling Index (PSI).

LSI is used to determine the calcium carbonate stability of water. LSI may be determined as follows:

$$LSI = pH - pH_s$$

where $pH_s = (9.3 + A + B) - (C + D)$, and:
A=(Log 10[TDS]−1)/10=0.15
B=−13.12×Log 10(oC+273)+34.55=2.09 at 25° C. and 1.09 at 82° C.
C=Log 10[Ca2+ as CaCO3]−0.4=1.78
D=Log 10[alkalinity as CaCO3]=1.53

Sample output of an LSI determination may be as follows:

| | |
|---|---|
| 44.4 | Temp C. |
| 0.00472 | Alk moles |
| 0.00083587 | Ca moles |
| 0.021 | Ionic Strength |
| 8.503967901 | pKsp @ Temp and 0 umhos constant |
| 3.13352E−09 | Ksp @ Temp and 0 umhos constant |
| 8 | Δz^2 |
| 0.506454321 | ADH(T) |
| 9.84544E−09 | Qsp @ Temp and Conductivity |
| 1.17787E−05 | [CO3]s |
| 1.178023846 | CO3 ppm |
| 0.004696443 | [HCO3]s |
| 4.60257E−11 | K2a constant |
| 10.20858025 | pK2a @ Temp and 0 umhos constant |
| 6.18614E−11 | K2a @ Temp and 0 umhos constant |
| 4 | Δz^2 |
| 0.506454321 | ADH(T) |
| 1.09653E−10 | Q2a @ Temp and Conductivity |
| 4.37214E−08 | [H+]s |
| 7.359305978 | pHs |
| 8.63 | pH |
| 1.27 | LSI |

PSI is also used to determine the calcium carbonate stability of water. PSI may be determined as follows:

$$PSI = 2(pH_s) - pH_{eq}$$

where pHs is the pH at saturation and pHeq is an equilibrium pH based on the total alkalinity value, and:

$$pH_s = (9.3 + A + B) - (C + D)$$

where:
A=TDS factor=((log 10 TDS)−1)/10
B=Temperature factor=13.2(log 10 temperature, ° C.+273)+34.55
C=Calcium Hardness factor=log 10 calcium hardness−0.4
D=Total Alkalinity factor=log 10 M Alkalinity, and $$pH_{eq} = 1.465 \log(M\ Alkalinity) + 4.54$$

According to embodiments, the steps to calculate online SSI may include, in the case of LSI: (i) capturing cooling water hardness, alkalinity, and pH, (ii) capturing process side (e.g., steam) operating temperature, (iii) capturing cooling water outlet temperature, (iv) calculating skin temperature using process temperature and cooling water outlet temperature, and (v) using the skin temperature, hardness, alkalinity, and pH, to calculate SSI. The LSI is dependent on, in order of influence, pH, temperature, calcium content (hardness), alkalinity, and conductivity.

From the inlet temperature and outlet temperature, a Delta T value is determined subtracting the outlet temperature from the inlet temperature. As it relates to temperature, the outlet water and process side temperatures are relevant. These are used to calculate the skin temperature. The skin temperature is the temperature on the surface of the heat exchanger tubes that contacts the water. It can be thought of as a quasi-average between the process side and the cooling water side of the heat exchanger and is the temperature that is considered to be important when discussing the saturation index of water.

These factors greatly influence LSI and therefore scaling potential and chemical feed rates. In particular, an increase in any of pH, skin temperature, calcium content (hardness), and alkalinity, results in an increase in the SSI. An increase in conductivity results in a decrease in SSI. Such changes in these parameters may be driven from system load variation.

"Load variation" as used herein is defined as the change in heat exchanger heat duty (measured in Btus/hr) due to, for example, changes in demand, seasonal conditions, or changes in any of disclosed system parameters.

Chemical Feed Automation and Control

Using the online SSI calculation from above, antiscalant treatment solutions are able to be controlled, i.e., adjusted and optimized, while the system is online, thereby increasing overall efficiency and reducing costs. Feed system D feeds the chemical treatment solution into the water stream upstream of the heat exchanger 11, as illustrated in FIG. 1A. According to embodiments, the chemical treatment solution feed rates can be precisely and accurately controlled.

The chemical treatment solution may include any suitable system treatment chemical such as, for example, antiscalants or corrosion inhibitors. In embodiments, the chemical treatment solution includes an antiscalant. Any suitable scaling inhibitors may be used in the chemical treatment solution including, but not limited to, hydroxyethylidene diphosphonic acid (HEDP), phosphonobutane tricarboxylate (PBTC), polyamino polyether methylenephosphonate (PAPEMP), amino-tris-methylene phosphonate (AMP), diethylenetriaminepenta(methylene-phosphonate) (DETPMPA), polymaleic anhydride (PMA), acrylic acid/acrylamido methyl prone-sulfonate (AA/AMPS), phosphino-carboxylic acid polymer (PCA), polyacrylic acid (PAA), and mixtures thereof. It will be understood that the precise make-up of the antiscalant(s) in the chemical treatment solution will be dependent upon the requisite scale control plan and system operating conditions.

Figure 2:
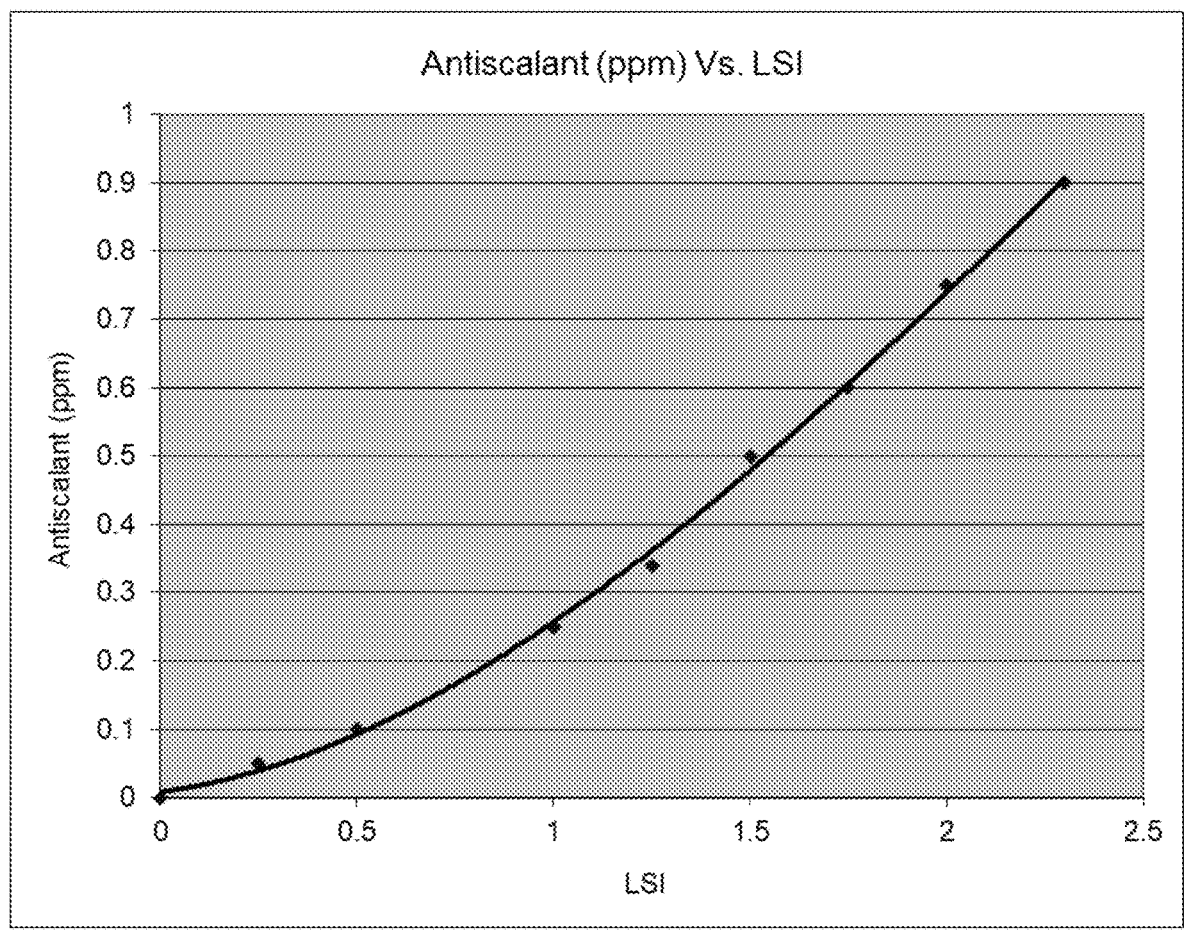
FIG. 2 is a chart showing an SSI curve according to an embodiment.

Similarly, the dosage control plan for the application of the treatment solutions will be dependent upon the specific contents of the antiscalant treatment solution, the control plan and system operating conditions. According to the online methods, the dosage amount and rate curves can be developed for each treatment solution applied, to thereby allow for the change in dosage amounts and rates based on the calculated SSIs. These curves plot SSI to ppm/ppb dose rate, as shown in, for example, the LSI curve illustrated in FIG. 2. SSI curves, such as the LSI curve illustrated in FIG. 2, are developed by determining the concentration of a specific scale inhibitor necessary to inhibit scale formation at various saturation index values along a spectrum.

It will be understood that these SSI curves for antiscalant treatment solutions for once-through applications may be different than normal cooling tower applications, since once-through applications rely on threshold inhibition. This is due to the fact that threshold inhibition is used for systems in which high heat duties are experienced over very short periods of time, e.g., 10 seconds or less. Therefore, standard concentrations used in cooling tower applications, which have very long holding time indices, e.g., hours if not days, are not necessary. Typically, antiscalants are fed at low ppb level, e.g., 10 to 40 ppb, for threshold inhibition in once-through systems, as opposed to ppm levels, e.g., 5 to 15 ppm, for cooling tower systems.

Figure 3:
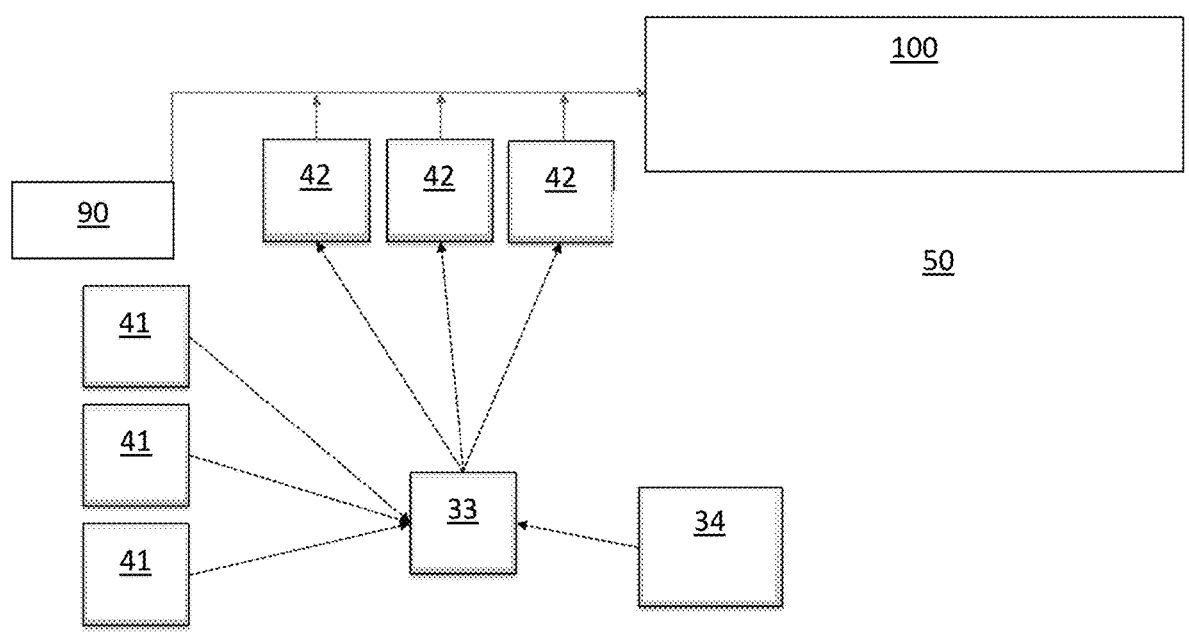
FIG. 3 is a schematic diagram of an automated chemical feed control system according to an embodiment.

FIG. 3 illustrates a control feed architecture 50 according to embodiments. The control feed architecture 50 includes at least one circulation pump for circulating the water flow through the plant and at least one chemical treatment solution pump, e.g., pumps 41, for feeding the chemical treatment solution into the water stream of the water system. Multiple circulation pumps and chemical treatment solution pumps may be provided in order to accommodate required volumes of water running through the system. In some systems, for example, there may be a throughput of hundreds of thousands of gallons of water per minute. As seen in FIG. 3 the distributed control system (DCS) controller 33 controls the operation of these pumps based on demand driven by various system parameters, e.g., seasonal load. The DCS controller 33 controls the overall operation of the plant and is where the plant instrumentation sends its data, and may include, for example, more than 25,000 data points. The architecture 50 further includes a data capture panel 34 for receiving operations input and providing the DCS controller 33 with the appropriate instructions for controlling the operation of the pumps. In this embodiment, the data capture panel includes the probes A-C, feed system D and PLC from the embodiments of FIGS. 1A and 1B.

By programming the antiscalant dosage versus SSI curves into the PLC shown in FIGS. 1A and 1B via automated recordation as described herein, the proper inhibitor dosage can be adjusted real-time using the calculated SSI. Once the dosage amounts and rates are calculated, these schemes may be stored in the storage for historical purposes. The schemes are then accessed by the DCS controller 33 when appropriate and applied to the water system via the control feed architecture 50 shown in FIG. 3. The control feed architecture 50 adjusts the amount and/or rate of the chemical treatment solution by, for example, calculating the ml/min set point to control and adjust the various chemical feed pumps, e.g., pumps 42, to control flow from the water source 90 to the water system 100. The dosage schemes for each specific antiscalant treatment solution are optimized in this manner.

Mineral Process Systems

The disclosed online SSI calculation and chemical feed embodiments can be used in conjunction with mineral process systems. These systems typically involve treating a heap of crushed and agglomerated ore with an appropriate lixiviant (e.g., a diluted alkaline cyanide solution) to dissolve the metals (leachate), collecting the leachate in a pond or tank (pregnant or value bearing solution), processing the pregnant solution to recover the metals, and recycling the barren solution (with additional lixiviant) back to the heap.

Figure 6:
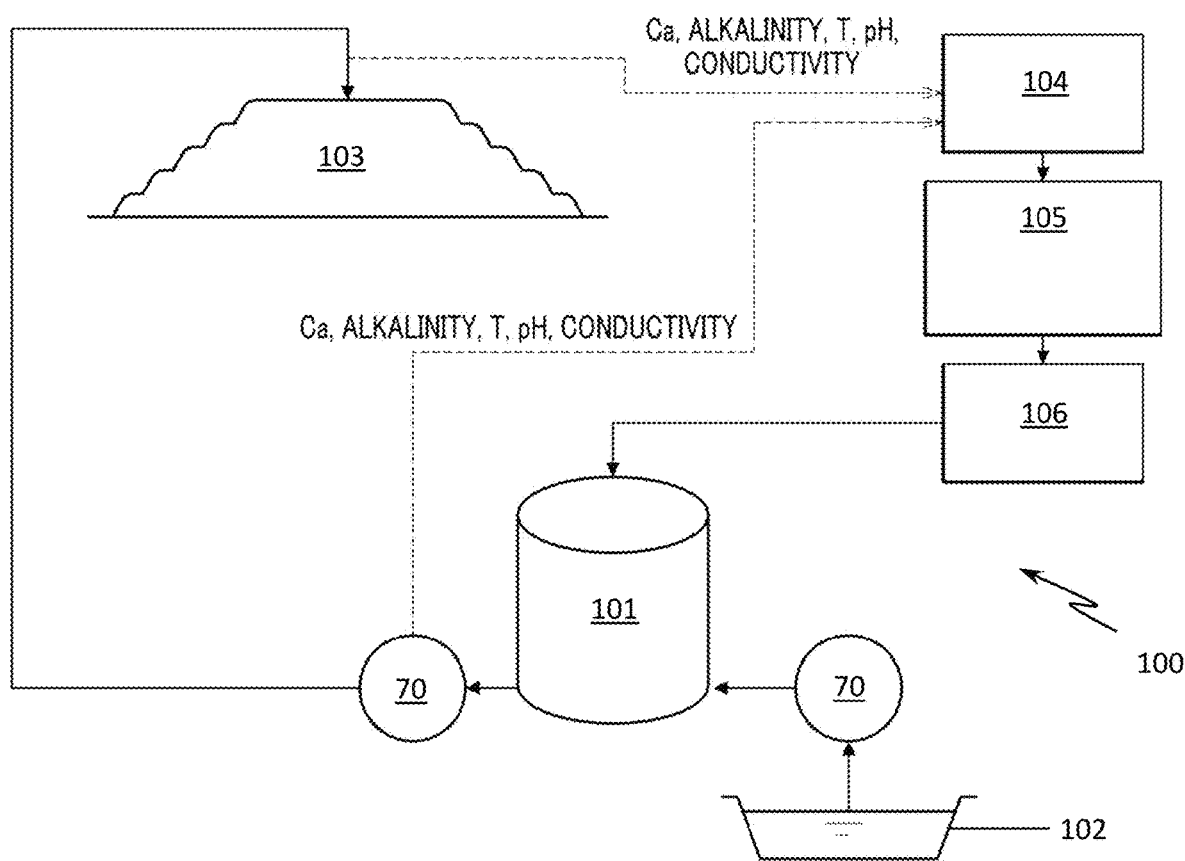
FIG. 6 is a schematic diagram of a mineral process system including an automated chemical feed control system according to an embodiment.
Figure 7:
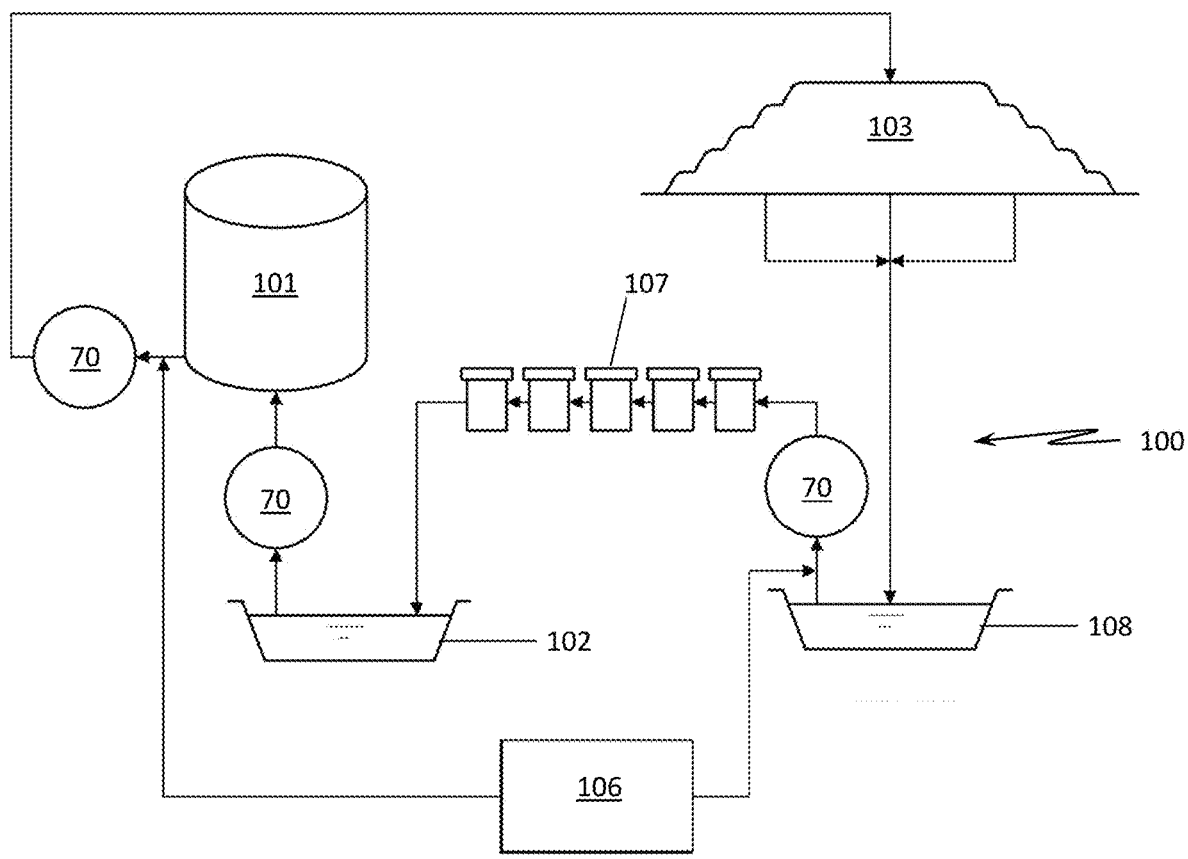
FIG. 7 is a schematic diagram of a mineral process system including an automated chemical feed control system according to an embodiment.

The mineral process system may be, for example, a gold mining system 100, as illustrated in FIGS. 6-8. According to embodiments, the process water calcium and M-alkalinity concentrations, pH, conductivity and temperature are measured in water samples from at least one of the barren tank 101 and barren pond 102 and the heap leach/patio 103 via pumps 70 using the data capture system 104, as shown in FIG. 6. The SSI for the water sample from the at least one of the barren tank 101 and barren pond 102 and/or the heap leach/patio 103 is then calculated using the controller 105, and the antiscalant is fed via the antiscalant feed system 106. The controller 105 may be, for example, a data analytics/communication system.

Measurements can be made at one point or several points in a single mining process stream to determine and then adjust the antiscalant feed rate to be that circuit operation. As seen in FIG. 7, antiscalant may be fed to the process water at several points in the leach circuit.

Feedpoints may include dosing of antiscalant to the barren solution being pumped from the barren tank 101 and/or barren pond 102 via pumps 70 to the leach pads, and to the pregnant solution from pregnant pond 108 being pumped via pumps 70 to the carbon-in-column operation 107. Based on the inputs of calcium, alkalinity, temperature, pH, and conductivity, the SSI can be calculated by the controller 105 in the panel. Appropriate for most mining streams, due to their high levels of alkalinity and pH, is the application of the PSI. Once the index has been calculated, the PLC will determine the appropriate antiscalant feed rate.

The controller 105 can be used and programmed to refine the antiscalant feed rate at the mine site. For example, a calcium balance in the circuit can be used to assess antiscalant performance. A calcium balance is determined by measuring the levels of calcium at the initial point of antiscalant application and again at the end of that particular process stream. Ideally, there should be no loss in calcium across this stream if the feed rate of antiscalant is adequate. For example, as shown in FIG. 8, the calcium levels could be measured at the outlet of the pregnant pond where antiscalant is being dosed, and then again at the outlet of the carbon columns. If the calcium levels are the same, it would indicate that no calcium was being lost in this circuit, and that the antiscalant dosage was adequate for the SSI being calculated. If there was a loss of calcium in this circuit (i.e., a decrease in the calcium level exiting the carbon columns versus at the start in the outlet of the pregnant pond) of more than 5%, for example, it could be concluded that the feed rate of antiscalant was too low for the SSI being calculated, and the logic in the PLC for the SSI-to-antiscalant dosage could be adjusted upwards to account for the actual field conditions. Conversely, if the calcium balance was fine (no losses greater than 5%, and the SSI remained fairly constant), the logic response for the SSI-to-antiscalant dosage could be adjusted downwards to further optimize the antiscalant feed rate to the stream.

The disclosed embodiments are unique in several ways. The SSI calculations are predictors of the potential for scale formation. Consequently, the value of SSI-to-antiscalant dosage can be set to prevent scale from forming. It is therefore a proactive online key performance indicator rather than reactive like the conventional performance monitors (e.g., the retractable scale coupons or manual monitors).

Additionally, the programmable logic behind the SSI-to-antiscalant dosage can be refined in the field in response to real-time real-world conditions and performance at the site. And adjustments to antiscalant dosages based on SSI and/or calcium balance can be made virtually instantaneously, as opposed to a periodic review of a coupon, or a reading from a deposit monitor, and the subsequent follow-up manual adjustment of the antiscalant feed pump. As a result, the disclosed embodiments will provide real-time and more effective scale control management compared to conventional processes by improving the overall reliability, efficiency, and economic productivity of the mine and its mineral recovery.

Embodiments may further include machine learning algorithms implemented on the disclosed controllers (i.e., controllers 13, 23, 33 and 105) for executing the disclosed functions in a predictive manner. For example, the machine learning algorithms may be used to establish historical patterns to predict future feed needs based on any one or more parameters that may include, but are not limited to, time of day, time of year, current weather, rainfall, and other process inputs. Outputs of the predictive logic controllers may be connected to, for example, a weather station to provide ambient weather data or other external reporting and analysis site such as inventory control device.

The programmatic tools used in developing the disclosed machine learning algorithms are not particularly limited and may include, but are not limited to, open source tools, rule engines such as Hadoop®, programming languages including SAS®, SQL, R and Python and various relational database architectures.

Each of the disclosed controllers may be a specialized computer(s) or processing system(s) that may implement machine learning algorithms according to disclosed embodiments. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the disclosed embodiments may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units, a system memory, and a bus that couples various system components including system memory to processor. The processor may include a module that performs the methods described herein. The module may be programmed into the integrated circuits of the processor, or loaded from memory, storage device, or network or combinations thereof.

EXAMPLES

The following examples were conducted in a once-through unit including a three-unit, coal-fired power plant. The facility produces about 1,760 MWhrs of electricity and helps to provide electricity to more than 320,000 typical homes when demand for power is highest. Examples 1 and 2 include temperature, LSI and antiscalant product data for various calculated skin temperature values induced by seasonal and system load variations throughout the months of July 2019 (Example 1) and February 2019 (Example 2).

Example 1

As seen in FIG. 4, an increase in the measured exit temperatures and calculated skin temperature values results in an observed increase in the calcium carbonate saturation index (i.e., LSI) and therefore the amount of antiscalant product required to treat the system (refer back to FIG. 2 for a general understanding of the LSI curve). In Example 1, the July swings in calculated skin temperatures, represented by the dashed-box in FIG. 4, represent an increase in product usage of about 334 lbs/day or $540, which roughly equates to $98,700 per year based on 50% operational utilization of the once-through unit.

Example 2

As seen in FIG. 5, an increase in the exit temperatures and calculated skin temperature values results in an observed increase in the calcium carbonate saturation index (i.e., LSI) and therefore the amount of antiscalant product required to treat the system (refer back to FIG. 2 for a general understanding of the LSI curve). In Example 2, the February swings in estimated skin temperature, represented by the dashed-box in FIG. 5, represent an increase product usage of about 514 lbs/day or $833, which roughly equates to $150,000 per year based on 50% operational utilization of the once-through unit.

Examples 1 and 2 demonstrate the commercial need for more efficient SSI measurement and chemical feed solutions in terms of managing seasonal and operational load variation. In this case, using the disclosed online SSI measurement and recordation, and chemical feed automation and control methods, Examples 1 and 2 suggest that the power plant could have saved about 20% on antiscalant chemistry.

Example 3

Using the mineral process system according to FIG. 8, water analyses using the inline probes indicated a pH of 8.5, a conductivity of 7,860 µmhos/cm, and a temperature of 25° C., and the inline wet chemistry analyses conducted by an online hardness and alkalinity analyzer according to embodiments indicated a level of calcium of 1730 ppm, as calcium carbonate ($CaCO_3$) and an M-alkalinity value of 275 ppm, as $CaCO_3$, the calculated LSI was 2.11 and the PSI was 4.66. Based on the curve in FIG. 2, the antiscalant feed rate was 3 ppm.

The feed rate value in ppm could then be converted to a millimeters per minute (ml/min) feed rate based on the flow rate of the process water stream being treated and the density of the antiscalant. For example, if the preg solution flowrate was 2,000 gallons per minute (gpm), and the antiscalant had a density of 9.52 pounds per gallon (ppg) the antiscalant feedrate would be calculated to be 25 ml/min. This information could then be transferred to the antiscalant feed pump, adjusting the feed rate as calculated.

It will be appreciated that the above-disclosed features and functions, or alternatives thereof, may be desirably combined into different methods and systems. Also, various alternatives, modifications, variations or improvements may be subsequently made by those skilled in the art, and are also intended to be encompassed by the disclosed embodiments. As such, various changes may be made without departing from the spirit and scope of this disclosure.

What is claimed is:

1. A method for applying a chemical treatment solution to a process stream in an industrial processing system comprising a heat exchanger, the method comprising, while the system is online:
   measuring a mineral hardness and alkalinity of the process stream;
   measuring an inlet-side temperature and an outlet-side temperature of the heat exchanger and determining a skin temperature of the heat exchanger based on the inlet-side temperature and the outlet-side temperature;
   determining a dosage of the chemical treatment solution based on a relationship between the dosage and a scale saturation parameter that is calculated based on the mineral hardness and the alkalinity of the process stream, and the skin temperature of the heat exchanger; and
   controlling application of the chemical treatment solution to the process stream based on the determined dosage.

2. The method for applying a chemical treatment solution to a process stream according to claim 1, further comprising calculating the relationship based on the measured mineral hardness and alkalinity of the process stream, and the skin temperature of the heat exchanger.

3. The method for applying a chemical treatment solution to a process stream according to claim 1, further comprising measuring at least one of temperature, calcium concentration, salinity, conductivity, and pH of the process stream; and
   calculating the relationship based on the at least one of temperature, calcium concentration, salinity, conductivity, and pH of the process stream.

4. The method for applying a chemical treatment solution to a process stream according to claim 1, wherein the mineral hardness and alkalinity of the process stream is measured continuously.

5. The method for applying a chemical treatment solution to a process stream according to claim 1, wherein the mineral hardness and alkalinity of the process stream is measured in intervals.

6. The method for applying a chemical treatment solution to a process stream according to claim 1, wherein the chemical treatment solution includes at least one antiscalant selected from the group consisting of hydroxyethylidene diphosphonic acid, phosphonobutane tricarboxylate, polyamino polyether methylenephosphonate, amino-tris-methylene phosphonate, diethylenetriaminepenta(methylene-phosphonate), polymaleic anhydride, acrylic acid/acrylamido methyl prone-sulfonate, phosphino-carboxylic acid polymer, and polyacrylic acid.

7. The method for applying a chemical treatment solution to a process stream according to claim 1, wherein the process stream is a water stream in a water system, and
   application of the chemical treatment solution to the water stream includes feeding the chemical treatment solution upstream of the heat exchanger in the water system.

8. The method for applying a chemical treatment solution to a process stream according to claim 1, wherein the process stream is a mineral process stream in a mineral process system, and
   application of the chemical treatment solution to the mineral process stream includes feeding the chemical treatment solution upstream of a heap leach in the mineral process system.

9. The method for applying a chemical treatment solution to a process stream according to claim 1, wherein controlling application of the chemical treatment solution to the process stream includes controlling a rate of application of the chemical treatment solution.

10. The method for applying a chemical treatment solution to a process stream according to claim 8, where the rate of the chemical treatment solution applied is increased or decreased during a time period corresponding to a time period of increased seasonal or operational load on the industrial processing system.

11. The method for applying a chemical treatment solution to a process stream according to claim 1, wherein controlling application of the chemical treatment solution to the process stream includes controlling an amount of the chemical treatment solution applied.

12. The method for applying a chemical treatment solution to a process stream according to claim 10, where the amount of the chemical treatment solution applied is increased or decreased during a time period corresponding to a time period of increased or decreased seasonal or operational load on the industrial processing system.

13. The method for applying a chemical treatment solution to a process stream according to claim 1, wherein the industrial processing system includes at least one chemical feed pump,
   and controlling the application of the chemical treatment solution to the process stream includes separately controlling a rate of application of the chemical treatment solution through the at least one chemical feed pump.

14. The method for applying a chemical treatment solution to a process stream according to claim 1, wherein the relationship is a scale saturation curve.

15. The method for applying a chemical treatment solution to a process stream according to claim 1, further comprising recording the measured mineral hardness and alkalinity of the process stream, and the skin temperature of the heat exchanger.

16. The method for applying a chemical treatment solution to a process stream according to claim 1, wherein the mineral hardness and alkalinity of the process stream is measured with an online hardness and alkalinity analyzer.

17. The method for applying a chemical treatment solution to a water stream according to claim 1, wherein the industrial processing system is a once-through water system or a recirculating water system.

18. The method for applying a chemical treatment solution to a process stream according to claim 1, wherein the industrial processing system is a gold-mining system.

19. The method for applying a chemical treatment solution to a process stream according to claim 1, wherein the skin temperature is a temperature on a surface of heat exchanger tubes of the heat exchanger that contacts the process stream.

20. The method for applying a chemical treatment solution to a process stream according to claim 1, wherein skin temperature is determined by calculating a quasi-average between the inlet-side temperature and the outlet-side temperature of the heat exchanger.

\* \* \* \* \*